(No Model.)

W. B. ALDEN.
MODE OF MAKING TUBES.

No. 367,494.  Patented Aug. 2, 1887.

ATTEST:
J. Murdle
John J. Packert

INVENTOR:
William B. Alden
by
A. Bell Malcom
his Attorney

UNITED STATES PATENT OFFICE.

WILLIAM B. ALDEN, OF BROOKLYN, NEW YORK.

MODE OF MAKING TUBES.

SPECIFICATION forming part of Letters Patent No. 367,494, dated August 2, 1887.

Application filed February 26, 1887. Serial No. 229,043. (No model.)

*To all whom it may concern:*

Be it known that I, WILLIAM B. ALDEN, of the city of Brooklyn, in the county of Kings and State of New York, have made certain new and useful Improvements in the Art of Making Spirally-Welded Sheet-Metal Tubing; and I hereby declare that the following is a full and clear description of the same, reference being had to the accompanying drawings, in which—

Figure 1:
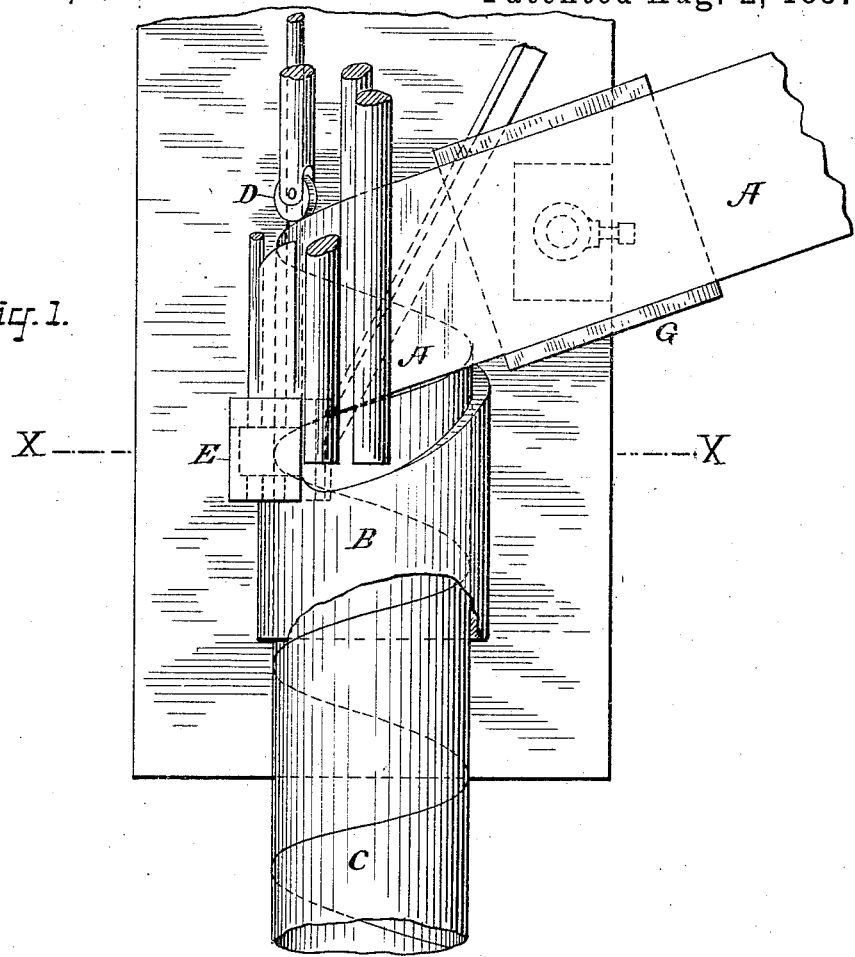
Figure 2:
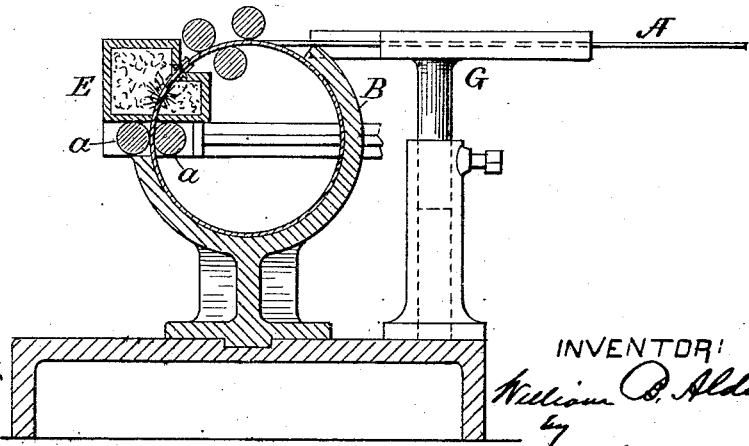

Figure 1 is a plan view showing the manner of forming and welding the pipe from a flat strip or blank of metal. Fig. 2 is a section through the line X X of Fig. 1.

In making spiral pipe from sheet metal the edges of the strip or blank of sheet metal have heretofore been laid one over the other, or lapped, and then welded or riveted together or secured by lock-joints in various ways. In all such methods of forming the pipe or tubing great difficulty has been experienced from the unevenness of the joint. In cases where the blank or strip of sheet metal is welded the overlapped portion produces a surplus of material at the point along the edges where it is heated for welding, which draws and twists the pipe out of shape, and where the sheets of metal are lapped and then heated the single thickness of sheet metal on each side of the lap is burned before the double thickness is at a welding heat.

The nature of my invention relates to a new mode of making what is known as "spiral sheet-metal pipe or tubing," so as to overcome these and other defects arising from lapping the sheet metal at the point of heating and joining the strip as it is wound spirally into a pipe.

In making my improved pipe a flat strip or blank of sheet metal, A, is used and is fed spirally inside a ring or cylindrical former, B, so that the edge of that portion of the metal strip which is being fed in is brought closely and evenly against the edge of the other portion, which has been already wound into shape, but not overlapping it.

The ring or former B is of the size or diameter of the outside of the pipe or tube to be formed, and the completed tube or pipe, which is shown at C, passes through and out of it, as shown in Fig. 1.

As the strip of sheet metal, A, is fed into the former one edge is pressed firmly against the edge of the other portion of the pipe by the guide-roller D. When the strip of sheet metal is formed up and the edges are thus brought together, they are heated along the seam or point of contact to a welding heat by any convenient means—such as an adjustable welding-furnace adapted to such purpose, which is shown in the drawing at E—and then the heated joint as it leaves the welding-furnace is subjected to pressure between rollers *a a*, so as to flatten down any unevenness in the seam. The edges of the sheet-metal strip being held together firmly when heated in the furnace up to a welding heat, and the body of the strip being unheated, the metal where heated will expand and force the edges hard together, so that very little, if any, additional manipulation is required to make a weld. One or both edges of the strip may be slightly thickened by hammering or pressure on such edges before forming it into the spiral shape, if desired, so as to produce a sufficiency of metal at the point of welding.

Instead of the rollers *a a*, any description of welding-tools may be used, so long as it is a welding mechanism that works obliquely or spirally and follows the direction of the spiral seam in the pipe, and the edges when heated are subjected to hammering from both sides or from either side at the point where they have just passed the heating-furnace and are at a welding heat.

Instead of the forming ring or cylinder B, a mandrel on the inside over which the blank or strip is wound to form the spiral pipe may be used, so long as the butting edges of the spirally-wound strip or blank are brought and held firmly and closely together, but not overlapping, and the edges of such strip heated to a welding heat, and the seam or joint at the point so heated compressed between rolls or other welding-tools on leaving the welding-furnace.

The drawings represent one of the means for practicing my improved mode of welding spiral tubing, and the mechanical devices shown by such drawings are the subject of another application for a patent thereon.

This improved mode of manufacture of spiral tubing or pipe overcomes the difficulties experienced from the surplus of metal in welding where the joints are lapped, preventing the twisting of the material, and makes a very neat and desirable tubing out of thin sheet metal, which is of uniform diameter outside and inside. By having only one thickness of the sheet metal to heat to a welding heat the metal strip near the seam need not be burnt and destroyed, as is often the case where the double thickness at the lap has to be subjected to a much greater heat from the furnace than is required for one thickness of metal, and consequently burns the adjoining single thickness.

I am aware that narrow thick strips of steel or iron have been "fabricated of a precise form" and then spirally coiled around a mandrel, after which such coil is taken off the mandrel and "brought to a welding heat in a suitable furnace," after which it is manipulated as one piece and the edges welded by cross-rolling, so as to make a gun-barrel; but I do not wish to be understood as intending to claim any such process or any such class of spiral pipe or tube.

My invention is not applicable to the making of gun-barrels, but is an improvement in the manufacture of a continuous pipe of sheet metal, the edges only of the thin strip or flat sheet metal being heated and welded, a little at a time, as the pipe is turned out.

What I claim as my invention, and desire to secure by Letters Patent, is—

1. The herein-described mode or process of making sheet-metal pipe or tubing, consisting in bending a strip of sheet metal spirally into tubular form, with the edges abutting but not overlapping, and simultaneously heating and uniting such edges by welding, a little at a time, by the pressure of rolls against the sides and edges of the strip, substantially as shown and described.

2. The process of making pipes or tubes from sheet metal by bending a strip of sheet metal spirally with the edges joining but not lapping, and then while pressed hard together simultaneously heating and uniting such edges a little at a time by welding-tools working obliquely or spirally along said tube, substantially as shown and described.

WILLIAM B. ALDEN.

Witnesses:
JAMES H. HUNTER,
A. BELL MALCOMSON, Jr.